(12) United States Patent
Wang et al.

(10) Patent No.: US 7,833,425 B2
(45) Date of Patent: Nov. 16, 2010

(54) METHOD FOR FABRICATING MICRO AND NANO STRUCTURES

(75) Inventors: Benzhong Wang, Singapore (SG); Soo Jin Chua, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 596 days.

(21) Appl. No.: 11/843,401

(22) Filed: Aug. 22, 2007

(65) Prior Publication Data

US 2008/0047929 A1    Feb. 28, 2008

(30) Foreign Application Priority Data

Aug. 22, 2006    (SG) .............................. 200605650-1

(51) Int. Cl.
 *B29D 11/00*    (2006.01)
(52) U.S. Cl. .............................. 216/24; 977/888; 216/2
(58) Field of Classification Search .................... 216/24, 216/2; 977/888
 See application file for complete search history.

(56) References Cited

U.S. PATENT DOCUMENTS

| 6,350,388 | B1 | 2/2002 | Knappenberger et al. |
| 6,464,890 | B2 | 10/2002 | Knappenberger et al. |
| 6,649,939 | B1 | 11/2003 | Wirth |
| 6,679,998 | B2 | 1/2004 | Knappenberger et al. |
| 6,791,117 | B2 | 9/2004 | Yoshitake et al. |
| 6,812,161 | B2 | 11/2004 | Heremans et al. |

OTHER PUBLICATIONS

Krames et al., "High-Power Truncated-Inverted-Pyramid (Alx Ga1-x) 0.5 In 0.5 P/GaP Light-Emitting Diodes Exhibiting >50% External Quantum Efficiency", Applied Physics Letters, vol. 75, No. 16, pp. 2365-2367, Oct. 18, 1999.
Windisch et al., "Impact of Texture-Enhanced Transmission on High-Efficiency Surface-Textured Light-Emitting Diodes", Applied Physics Letters, vol. 79, No. 15, pp. 2315-2317, Oct. 8, 2001.
Oder et al., "III-Nitride Blue and Ultraviolet Photonic Crystal Light Emitting Diodes", Applied Physics Letters, vol. 84, No. 4, , pp. 466-468, Jan. 26, 2004.
Khizar, et al., Nitride Deep-Ultraviolet Light-Emitting Diodes with Microlens Array, Applied Physics Letters 86, 173504 (2005).
Chen et al., "Fabrication and Performance of Efficient Blue Light Emitting III-Nitride Photonic Crystals", Applied Physics Letters, vol. 85, No. 17, pp. 3663-3665, Oct. 25, 2004.

*Primary Examiner*—Roberts Culbert
(74) *Attorney, Agent, or Firm*—Victor Cardona; Heslin Rothenberg Farley & Mesiti PC

(57) ABSTRACT

A method of forming an array of selectively shaped optical elements on a substrate, the method including the steps of providing the substrate, the substrate having an optical layer placed thereon; placing a layer of particles on the optical layer; performing an etching cycle. The cycle includes the steps of: etching the layer of particles, using a first etching process so as to reduce the size of the particles within the layer, then; simultaneously etching the optical layer and the layer of particles, using a second etching process, the further reducing particles forming a mask over areas of the optical layer to create discrete optical elements from the optical layer.

30 Claims, 8 Drawing Sheets

| 1, treat surface of a LED to be hydrophilic | ← 5 |

⬇

| 2, form a monolayer of spherical particles on the surface | ← 10 |

⬇

| 3, selectively etch the spherical particles to reduce the diameters of the particles | ← 15 |

⬇

| 4, etch the material of top layer of the LEDs as well as the particles for a predetermined duration. | ← 20 |

⬇

| 5, repeat step3 and step 4 till the desired structures on the top layer of LEDs obtain | ← 25 |

Fig.1

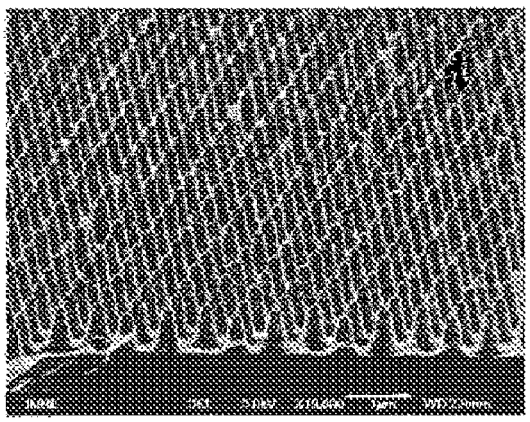
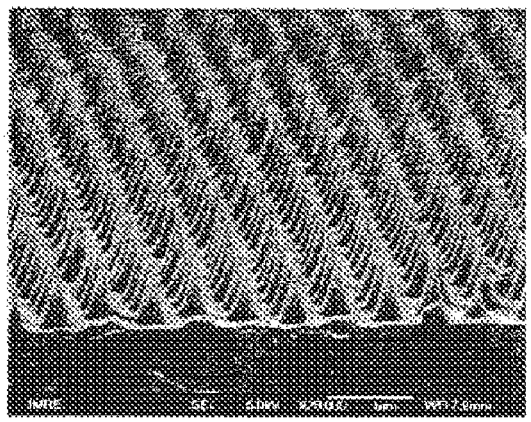
Fig. 6a
Fig. 6b
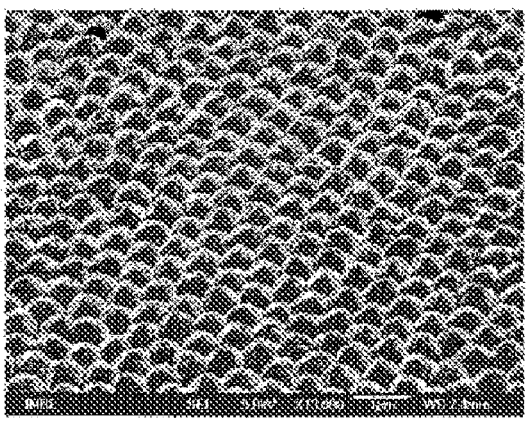
Fig. 6c

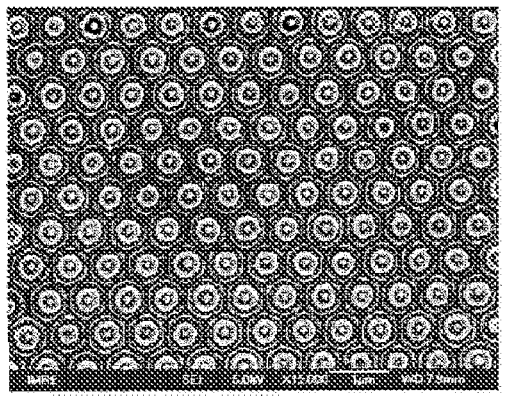
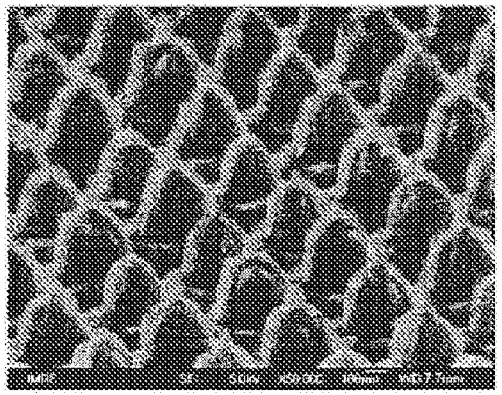
Fig. 7a				Fig. 7b
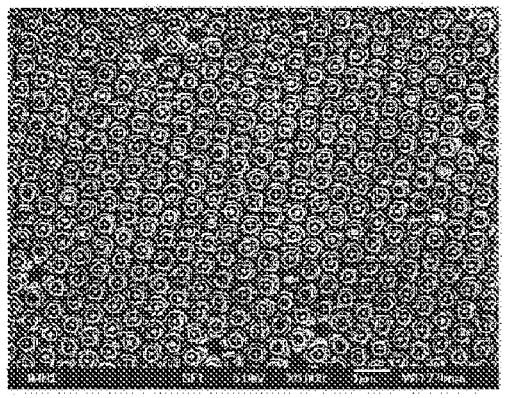
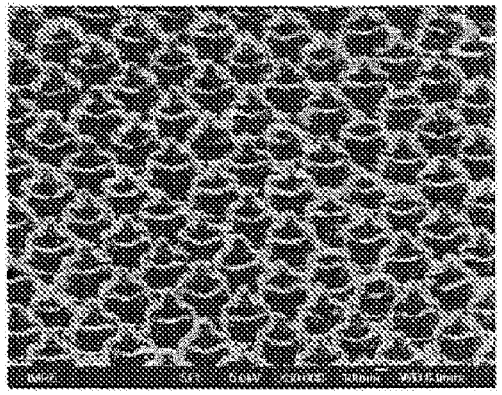
Fig. 8a				Fig. 8b
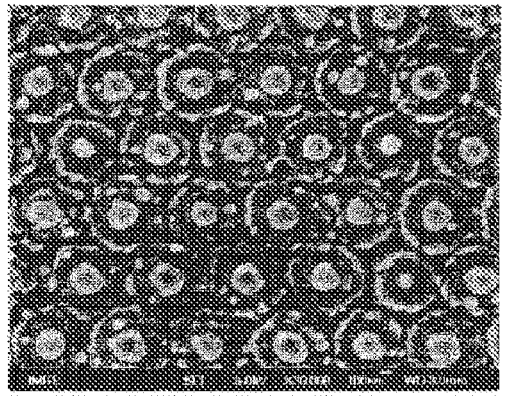
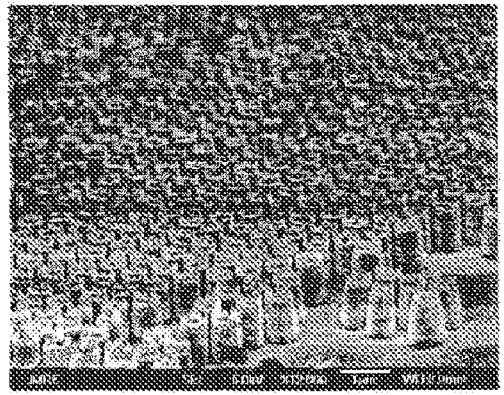
Fig. 9a				Fig. 9b

METHOD FOR FABRICATING MICRO AND NANO STRUCTURES

CROSS REFERENCE TO RELATED APPLICATIONS

This application claims priority from Singaporean patent application No. SG 200605650-1, filed on Aug. 22, 2006, the entire disclosure of which is incorporated herein by reference.

FIELD OF THE INVENTION

The invention relates to the fabrication of optical devices, including but not limited to LED's, light detectors, photovoltaic cells etc. In particular, the invention relates to the fabrication of common sub-elements within such devices.

BACKGROUND

Light emitting diodes (LEDs) are typically constructed by growing a p-n diode on a substrate. The diode is constructed by growing a layer of n-doped material on the substrate, growing a light generation region on the n-doped layer, and then growing the layer of p-doped material on top of the n-doped material. An electrode is then deposited on the top surface of the p-doped layer, and a contact is made to the n-doped layer. Light may be extracted either through the substrate or through the top surface of the p-doped material or through the top electrode. If the light is to be removed through the top electrode, the electrode is constructed from a transparent material such as indium tin oxide or thin gold film.

The efficiency of an LED is the product of two efficiencies, the efficiency with which power applied to the electrodes is converted to light and the efficiency with which that light is coupled out of the device. For a normal LED fabricated on a substrate, a large fraction of the light generated in the diode is lost because of poor coupling efficiency. Most semiconductors have an index of refraction that is much higher than that of air or the epoxy encapsulants. Accordingly, only light impinging on the surface of the diode in a small cone of angles will escape the surface due to total internal reflection. Most of the remaining light is reflected back into the diode layers and is trapped in a waveguide bounded by the substrate surface and the top surface of the diode. Much of this trapped light is eventually absorbed within the device. Accordingly, the efficiency of semiconductor diode is less than ideal.

One method that has been suggested for improving the extraction efficiency of an LED requires the LED to be macroscopically shaped such that light generated in the device strikes the surface at the critical angle or smaller, thereby preventing the total internal reflection. The problem can be avoided if the chip is shaped as a hemisphere or truncated pyramid. Such shaping of the chip is very cumbersome and quite costly.

A second prior art method is disclosed in U.S. Pat. No. 6,812,161, the contents are incorporated herein by reference. Here, a method for improving the extraction efficiency of a GaAs-based LED utilizes a roughening of the upper surface of the LED by etching to destroy the planar nature of the surface thereby providing a large variety of non-planar facets through which light striking the surface can exit.

The prior methods for roughening the surface involve a random etching of the top surface of the LED. For example, an irregular etch pattern can be generated by depositing particles on the surface of the LED and then using the particles to define a random etch mask. For these methods of the prior art, two processes were used to fabricate the roughened surface: first, diameters of the particles were reduced by selective etching, and second, surface structures were fabricated by dry etching using the particles as masks. The sidewall of the resulting surface structures created by the prior methods are nearly vertical as the selected etching process for creating the surface structures does not etch the particles, which served purely as masks. These cylinder-like structures (as shown in FIG. 3) may still limit extraction efficiency.

The internal quantum efficiency of LED is almost 100% due to the development of growth technologies. However, the light extraction efficiency for a normal LED is very low due to total internal reflection at the interface between the semiconductor and air. Typically, for a normal GaAs based LED, only ~2% light generated in active layer can be extracted. This problem has partly been solved by surface roughing or surface texturing. However, low cost and high throughput technologies for surface texturing are desired. U.S. Pat. No. 6,812,161 discloses a method to fabricate LEDs with randomly arranged pillar structures by using spherical particles as masks. In addition, almost surface textures formed on LED are simple post-like structures as shown in FIG. 3 or hole arrays (random or ordered). Such simple structures limit further increase of light extraction efficiency which strongly depends on the material system, emitting wavelength, layer structures and surface structures of LEDs.

SUMMARY OF INVENTION

In a first aspect, the invention provides a method of forming an array of selectively shaped optical elements on a substrate, the method comprising the steps of: providing the substrate, said substrate having an optical layer placed thereon; placing a layer of particles on the optical layer; performing an etching cycle, said cycle comprising the steps of etching the layer of particles, using a first etching process so as to reduce the size of the particles within the layer, then; simultaneously etching the optical layer and the layer of particles, using a second etching process, the further reducing particles forming a mask over areas of the optical layer to create discrete optical elements from the optical layer.

The invention provides a method for fabricating complex surface structures. Cross-section profile of such structures can be easily changed to match requirements for further increasing light extraction efficiency.

In one embodiment, the invention may fabricate core- or truncated core-shaped surface structures. First, diameters of monolayered spherical particles, which are placed on a selected surface of a LED wafer, are reduced to a predetermined value by selectively etching. Second, surface structures are fabricated by dry etching through using the particles as initial masks. In this embodiment the etchants may be chosen to etch not only the semiconductor material but also the particles, which results in formation of core-shaped surface structures, if the etch is stopped till the particles are etched out, or truncated core-shaped surface structures if the etching is stopped before the particles are etched out. The angle normal to the surface of the core-shaped structures may be controlled by using different etchants, particle materials and etching means, which result in different ratio of etching rates between top layer of the device and the particles. Less than 45° of the angle of the core-like structures can be obtained if the etching rate of the particles is larger than that of the top layer of the device. Otherwise, larger than 45° of the angle of the core-like structures may be obtained.

In some cases, surface structures with different section profiles, for example, micro- or nano-lens array, may be desired for optimizing extraction efficiency of light. In a preferred embodiment, the invention may include a method to fabricate such structures by use of multi-cycles of the dry etchings. The section profiles may be changed as desired by controlling the etching durations, or as well as etchants. The structures with different section profiles may provide more choice of the structural parameters. Therefore, it may be possible to obtain optimized surface structures for certain devices according to emission wavelength, layer materials and layer structures to increase light extraction efficiency.

In a second aspect, the invention provides an array of selectively shaped optical elements on a substrate, said array formed according to a method comprising the steps of: providing the substrate, said substrate having an optical layer placed thereon; placing a layer of particles on the optical layer; performing an etching cycle, said cycle comprising the steps of etching the layer of particles, using a first etching process so as to reduce the size of the particles within the layer, then; simultaneously etching the optical layer and the layer of particles, using a second etching process, the further reducing particles forming a mask over areas of the optical layer to create discrete optical elements from the optical layer.

In a third aspect, the invention provides a method of forming an array of selectively shaped optical elements on a substrate, the method comprising the steps of: providing the substrate, said substrate having an optical layer placed thereon; placing a layer of particles on the optical layer; performing an etching cycle, said cycle comprising the steps of: etching the layer of particles, using a first etching process so as to reduce the size of the particles within the layer, then; etching the optical layer, using a second etching process, the reduced particles forming a mask over areas of the optical layer to create discrete optical elements from the optical layer; repeating the etching cycle at least once to further reduce the particle size and shape the optical elements, so as to form the selected shape of each optical element.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 1 is a flow diagram of the procedure of fabricating surface structures on a LED according to one embodiment of the present invention;

FIG. 6a is a near side-view of SEM image of the surface structures created on a GaAs-based LED wafer according to one embodiment of the present invention;

FIG. 6b is a near side-view of SEM image of the surface structures created on a GaAs-based LED wafer according to a further embodiment of the present invention;

FIG. 6c is a near side-view of SEM image of the surface structures created on a GaN-based LED wafer according to a further embodiment of the present invention;

FIG. 7a is a top-view of SEM image of surface structures created on a GaAs-based LED wafer according to one embodiment of the present invention;

FIG. 7b is a near side-view of SEM image of the surface structures of FIG. 7a;

FIG. 8a is a top-view of SEM image of surface structures created on a GaAs-based LED wafer according to one embodiment of the present invention;

FIG. 8b is a near side-view of SEM image of the surface structures of FIG. 8a;

FIG. 9a is a top-view of SEM image of surface structures created on a GaAs-based LED wafer according to one embodiment of the present invention;

FIG. 9b is a near side-view of SEM image of the surface structures of FIG. 9a;

DESCRIPTION OF PREFERRED EMBODIMENT

Embodiment 1

Figure 2A:
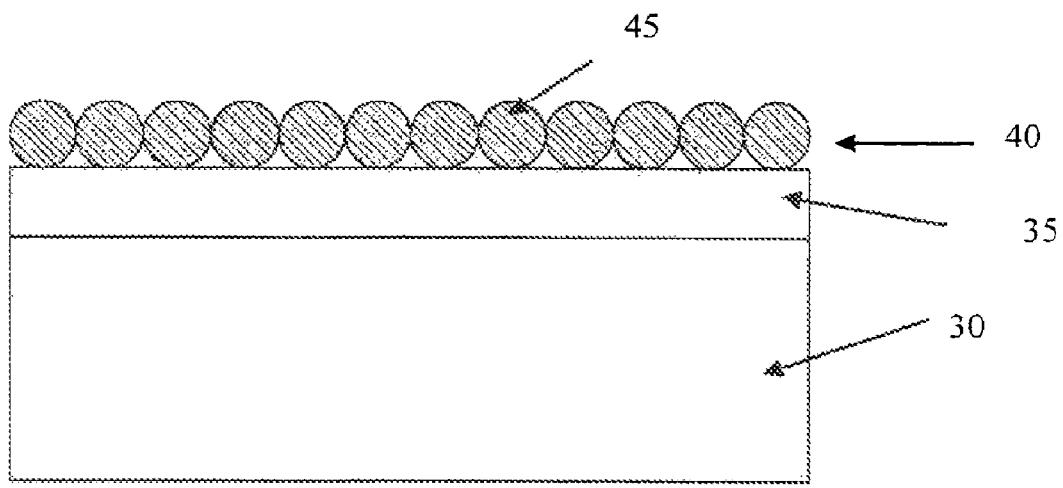
FIG. 2a is a cross-sectional schematic drawing showing a monolayer of close-packed spherical particles being arranged on the top surface of a LED.
Figure 2B:
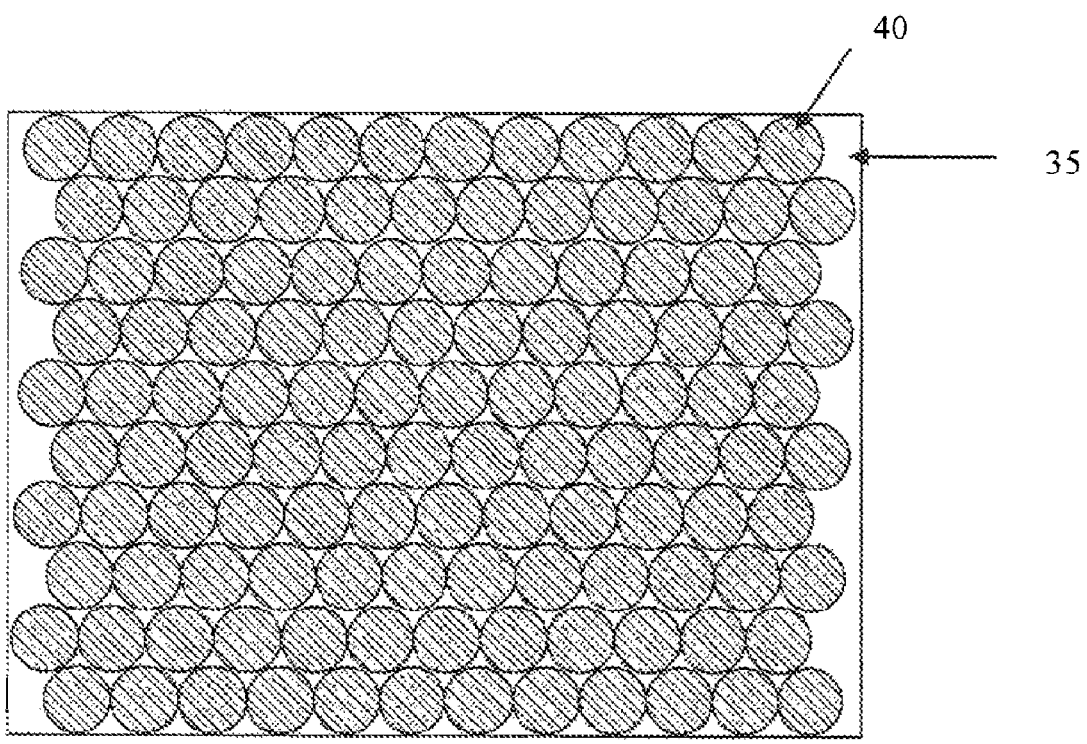
FIG. 2b is a schematic drawing showing the top view of a monolayer of close-packed spherical particles being arranged on the surface.
Figure 3:
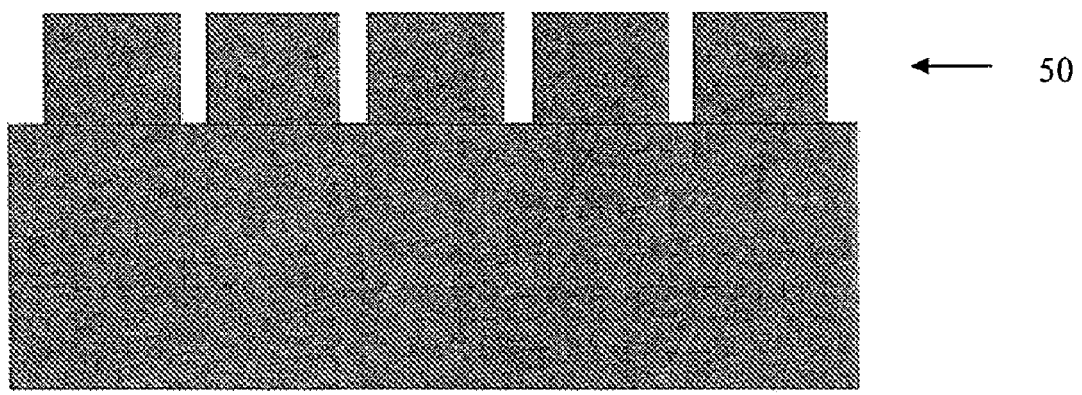
FIG. 3 is a cross-sectional schematic drawing showing structures fabricated by the prior art.

In a first embodiment, as shown in FIG. 2, the LED wafer 30 uses GaAs as a substrate, having a p type top layer 35, beside an active layer of multi quantum wells, a pair of n and p type cladding layers and a Bragg reflector grown by MOCVD. The material of the p type top layer is GaP with thickness being around 5 micrometer. The wavelength of light emitted from the LED wafer is around 635 nanometer (nm). Following the procedure indicated in FIG. 1, the surface of the wafer is treated 5 by ozone at 130° C. for 10 min, resulting in the surface to be hydrophilic. A monolayer 40 of polystyrene (PS) spheres 45 with mean diameter of 600 nm is self-assembled 10 on the top layer 35 from colloidal suspension of PS spheres purchased from a company, which is diluted to be around 20% w/w before deposition. It should be noted, that the invention may equally apply for particles in the range 100 nm to 10 μm.

A simple method to deposit 10 the PS spheres is used in these experiments. Several drops of the colloidal suspension are put on the surface of the wafer and spread to the desired region by tilting the wafer to about 40°. Due to gravity effect, a uniform film of the suspension containing the PS spheres is formed on the surface. As the solvent evaporates, the PS sphere 45 self-organized into a monolayer 40 of hexagonally close-packed colloidal crystal due to lateral capillary effect.

The wafer is then loaded into an Inductive coupled plasma (ICP) chamber to etch the nanostructures. Oxygen RIE at the conditions: $O_2$ flow, 20 sccm, RIE power, 200 W, chamber pressure, 8 mTorr is used for etching 15 the PS spheres 45 to reduce their diameters, while ICP with mixed $BCl_3$ and $Cl_2$ at the conditions: $BCl_3$: 20 sccm, $Cl_2$, 5 sccm, RIE power, 200 W, ICP power, 500 W, chamber press, 8 mTorr is used for GaP material of the top layer 35 as well as the PS sphere etching 20.

Figure 4:
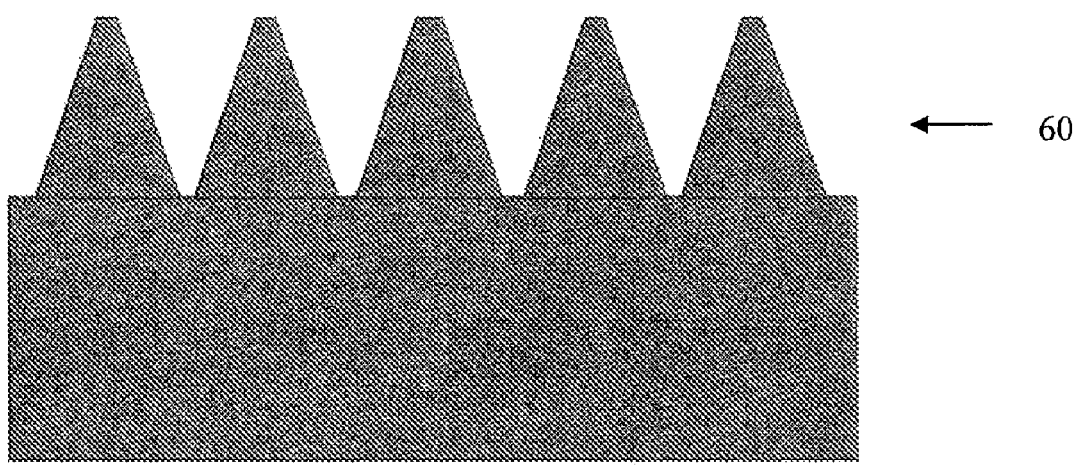
FIG. 4 is a cross-sectional schematic drawing showing a structure fabricated according to one embodiment of the present invention.

The etching rate of $O_2$ RIE for reducing diameters of the PS spheres 45 is not a constant, but it is much larger than that for semiconductor. Therefore, the $O_2$ RIE etching 15 only reduces the diameters of the PS spheres. However, the etching rate at the ICP conditions with the selected etchants of $BCl_3$ mixed with $Cl_2$ is approximately 6.18 nm/s for the GaP material (vertical direction), while it is approximately 2.78 nm/s, on average, for the PS spheres (diameter reduction). Actually, the PS spheres serve as changeable masks for etching the p type GaP layer 35 of the LED wafer 30 during the ICP etching 20, resulting in core-like or truncated core-like surface structures formation 60 as schematic showing in FIG. 4.

By example, FIG. 6a shows a near side view of a SEM image showing truncated core-like surface structures fabricated by using etching duration of 120 s of RIE and 90 s of ICP. Further, FIG. 6b is a near side view of a SEM image showing core-like surface structures fabricated by using etching duration of 130 s of RIE and 130 s of ICP.

Embodiment 2

Figure 5A:
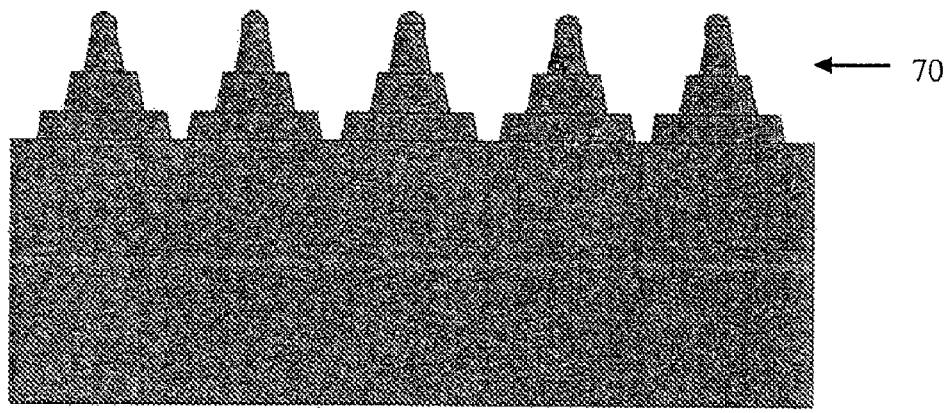
FIG. 5a is a cross-sectional schematic drawing showing a structure fabricated according to a further embodiment of the present invention.
Figure 5B:
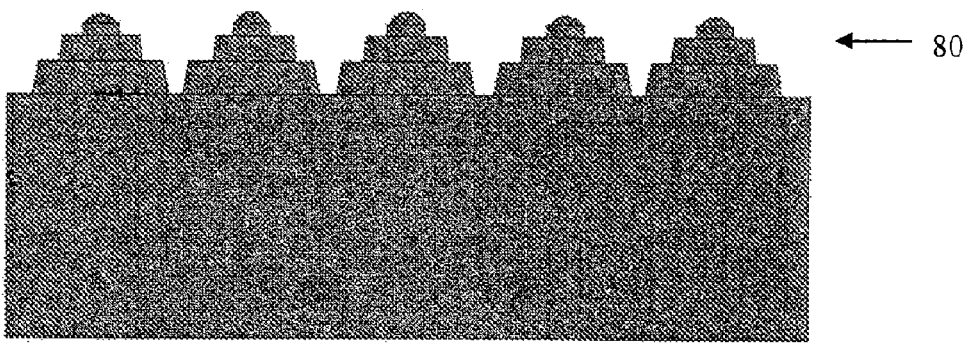
FIG. 5b is a cross-sectional schematic drawing showing a structure fabricated according to a further embodiment of the present invention.
Figure 5C:
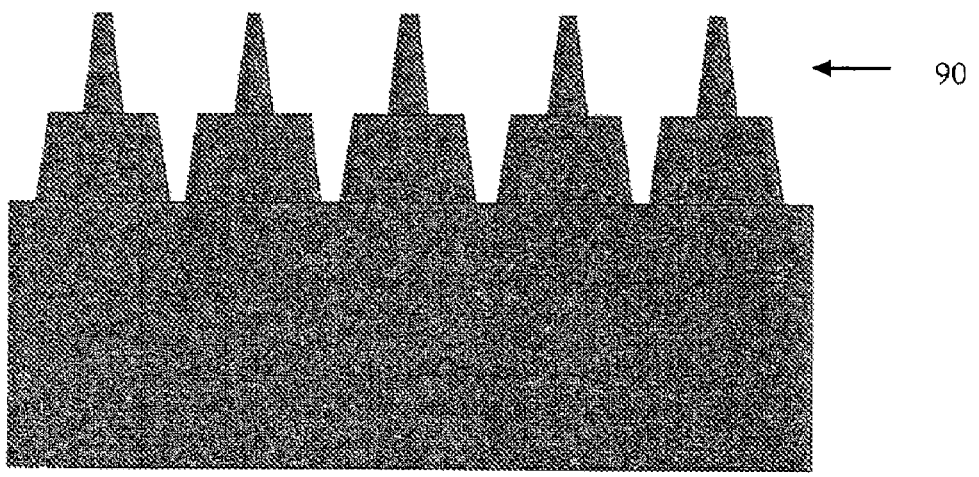
FIG. 5c is a cross-sectional schematic drawing showing a structure fabricated according to a further embodiment of the present invention.
Figure 10:
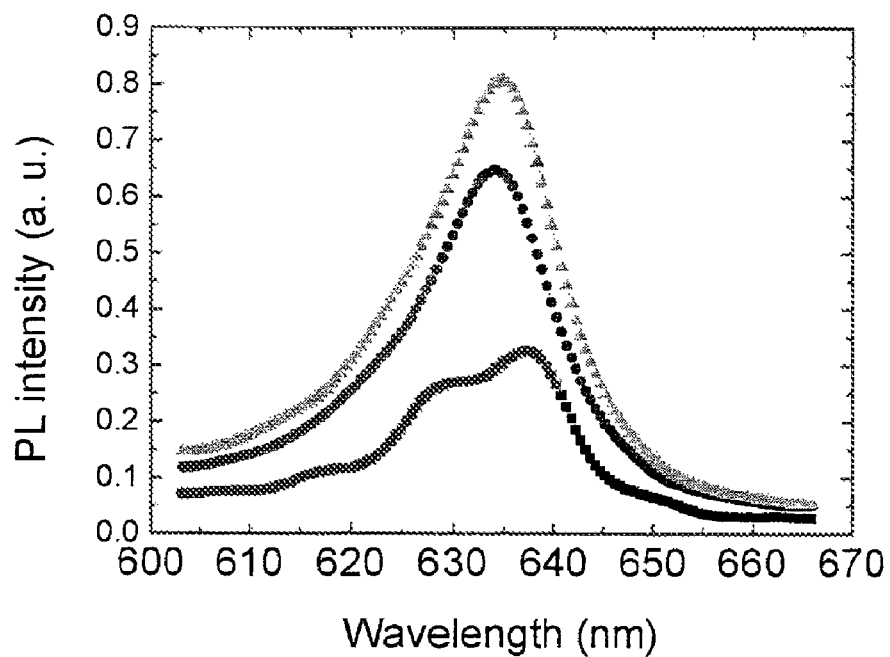
FIG. 10 is a graphical comparison of PL of a GaAs-based LED wafers without (square), with the surface structures of FIG. 6a (circular) and with the surface structures of FIG. 7a (triangular)

In a second embodiment, in order to obtain different section profiles of the etched structures, multi etching cycles 25 of RIE and ICP are used alternatively (multi-etching-cycle). FIGS. 5(a), (b) and (c) show some possible structures 70, 80, 90 that can be obtained by the invention using multi-etching-cycle process just simply changing etching durations at different etching steps.

For the following experiments, the etching conditions are kept the same as described in Embodiment 1 for all etchings, but the etching duration. The LED wafers and layering the monolayered PS spheres 40 on the LED wafer 30 are also similar to that mentioned in the Embodiment 1. Only the etching durations of RIE and ICP are varied to control the cross-section profiles of the etched structures on the top layer 35 of the LED wafer 30.

Examples of Embodiment 2 are shown in FIGS. 7(a), top-view and 7(b) tilted view of SEM images showing the surface structures fabricated by multi-etching-cycles. The etching duration of RIE and ICP in the first cycle is 60 s and 60 s, respectively. The second cycle is 60 s and 30 s, respectively. The third cycle is 30 s and 30 s, respectively.

Further examples may be seen in FIGS. 8(a), top-view and 8(b) tilted view of SEM images showing the surface structures fabricated by multi-etching-cycles. The etching duration of RIE and ICP during the first cycle is 60 s and 30 s, respectively. The second cycle is 30 s and 30 s, respectively. The third cycle is 30 s and 20 s, respectively. The forth cycle is 30 s and 20 s, respectively. The fifth cycle is 30 s and 20 s, respectively.

Still further examples may be seen in FIGS. 9(a), top-view and 9(b) tilted view of SEM images showing the surface structures fabricated by multi-etching-cycles. The etching duration of RIE and ICP during the first cycle is 60 s and 90 s, respectively. The second cycle is 60 s and 20 s, respectively. The third cycle is 30 s and 10 s, respectively.

Figure 11:
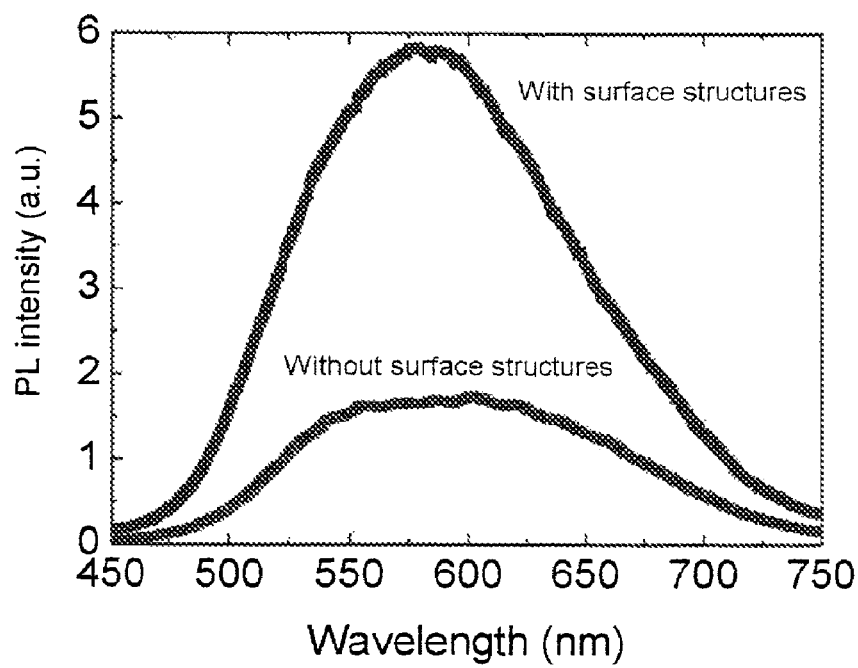
FIG. 11 is a graphical comparison of PL of a GaN-based LED wafer without (square), with the surface structures of FIG. 6c (circular)

The effects of the surface structures on optical properties have also been investigated after removing any remaining PS spheres by toluene. FIG. 11 shows a comparison of photoluminance (PL) intensity of the wafer without (square) and with the surface structures fabricated by one-cycle etching process as shown in FIG. 6a (circular) and multi-cycle-etching process as shown in FIG. 7 (triangle). Remarkable increase of the PL intensity is observed due to the surface structures fabricated by our invention.

Figure 12:
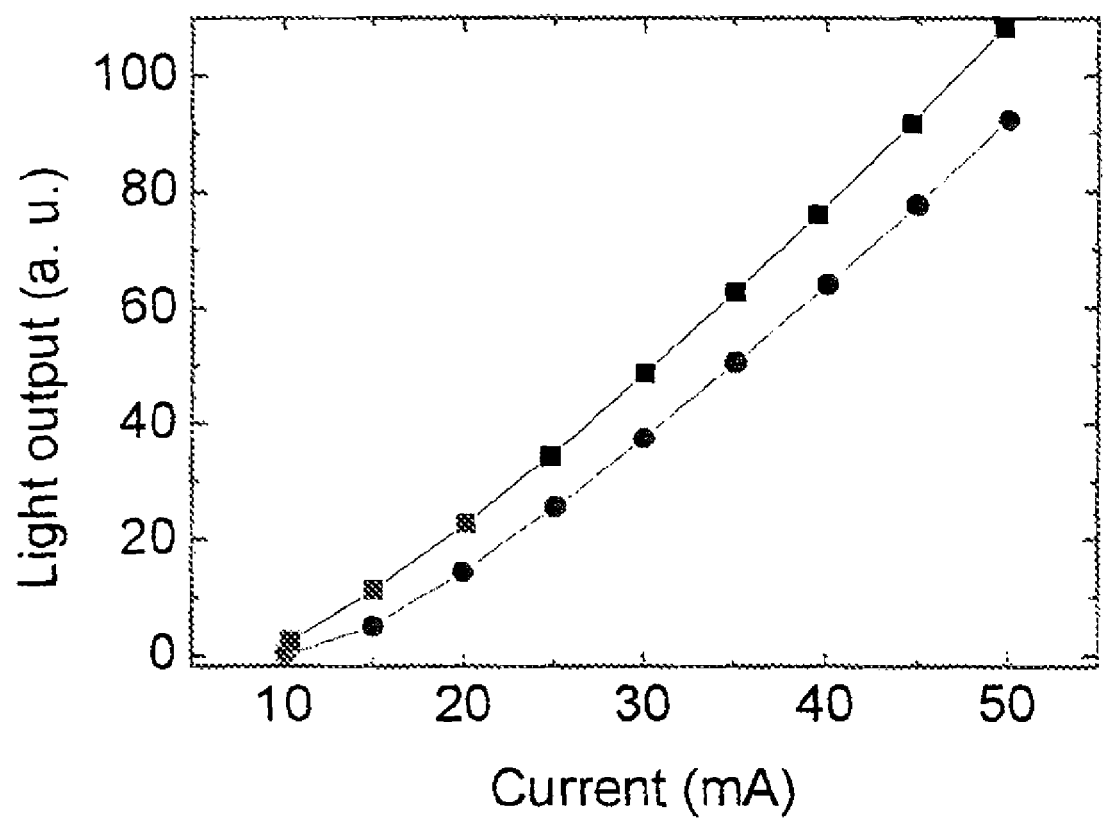
FIG. 12 is a graphical comparison of light output of the red LEDs with the surface structures as shown in FIG. 6a (circular) and without the surface structures (square).

LEDs with the surface structures formed by using this invention, as seen in FIG. 6a, are fabricated. A p type contact of Ti (10 nm), Pd (20 nm) and Au (500 nm) are form by lift-off process after e-beam evaporation and annealed at 430° C. for 40 s. An n type contact of AuGe (80 nm), Ni (10 nm) and Au (200 nm) is form on the back side of the wafer followed by annealing at 400° C. for 30 s. The same electrodes are also formed at the region without surface structures for comparison. LEDs at wafer level are measured using a power meter, which is placed above the LEDs about 2.5 cm. FIG. 12 shows the average results of light output of the LEDs with surface structures as shown in FIG. 6a and that without the surface structures. Over 40% enhancement of the light output has been obtained at the injection current of 20 mA.

Embodiment 3

In a third embodiment, a GaN-base LED wafer is used and the top layer is p type GaN material (~300 nm thick). The wavelength of light emitted from the LED wafer is around 570 nm. A thin hydrophilic $SiO_2$ film with thickness of ~30 nm is deposited by PECVD on the surface of the wafer in order to arrange the PS spheres. The same sized PS spheres and it's self-assembling into monolayer process as mentioned in Embodiment 1 are used for the wafer.

After arranging the monolayered PS spheres on the wafer, it is then loaded into an ICP chamber to create the surface nanostructures. Oxygen RIE at the conditions: $O_2$ flow, 20 sccm, RIE power, 200 W, chamber pressure, 8 mTorr is used for etching the PS spheres to reduce their diameters, while ICP with mixed $BCl_3$ and $Cl_2$ at the conditions: $BCl_3$: 20 sccm, $Cl_2$, 10 sccm, RIE power, 200 W, ICP power, 500 W, chamber-press, 8 mTorr is used for p-GaN material as well as the PS sphere etching. In this case, the average etching rates for p-GaN and PS sphere are almost the same, which is around 1.7 nm/s.

Surface structures created on the top layer of the GaN-based wafer are shown in FIG. 6c, a tilted view of a SEM image. Etching durations of 60 s for RIE and 150 s for ICP are used in this embodiment. Core-like surface structures with sidewall angle normal to surface being around 450 are clearly observed. Over 3 times enhancement of PL intensity by the surface structures is obtained as seen in FIG. 11.

On completion of the device, said device may then have electrodes attached. Whilst different types of optical layers represent different embodiments falling within the scope of the invention, there are two kinds of optical layer which, in particular, are considered useful. Consequently, the attachment of said electrodes will be dependent on which type of optical layer is used.

In a first type, the optical layer may be a component of the end device. In this case, the optical layer is grown subsequently on the top of other layers of the device at the same time. This includes a highly doped semiconductor layer and also serves as a current channel for the electrodes and as a current spreading layer, spreading current out of the electrode area since the light generated under the electrode can not be exited. In this case, it is necessary to generate light elsewhere on the device, with the electrodes formed directly on a small area of the created optical elements.

In the second type, the optical layer may be placed after growth of the whole device structure. In this case, the optical layer may be not conductive, for example, when depositing a $SiO_2$ film on the wafer by another method. In this case, a window must be opened in order to form electrode on the layer of highly doped semiconductor of the device. That means part (a small area) of the optical elements have to be removed to expose the conductive semiconductor layer of the device.

The invention claimed is:

1. A method of forming an array of selectively shaped optical elements on a substrate, the method comprising the steps of:
    providing the substrate, said substrate having an optical layer placed thereon;
    placing a layer of particles on the optical layer; and
    performing an etching cycle, said cycle comprising the steps of:
        etching the layer of particles, using a first etching process so as to reduce the size of the particles within the layer, then;
        simultaneously etching the optical layer and the layer of particles, using a second etching process, the further reducing particles forming a mask over areas of the optical layer to create discrete optical elements from the optical layer.

2. The method according to claim 1, wherein the first etching process etches the particles at a rate slower than the second etching process.

3. The method according to claim 1, wherein a ratio of the etching rates between the particles and the optical layer, during the second etching process, is in the range of 3 to −10.

4. The method according to claim 3, wherein the ration of the etching rates between the particles and the optical layer, during the second etching process, is in the range of 2 to −5.

5. The method according to claim 1, further comprising the step of:
    repeating the etching cycle at least once to further reduce the size of the particles and shape the optical elements, so as to form the selected shape of each optical element.

6. The method according to claim 1, further including the step, prior to the placing step, of treating a surface of the optical layer so as to be hydrophilic.

7. The method according to claim 1, further comprising the step, prior to transferring the surface structures, of:
    repeating the etching cycle at least once to further reduce the size of the particles and shape the surface structures, so as to form the selected shape of each surface structure.

8. The method according to claim 1, wherein the substrate is selected from the group consisting of: an LED wafer, a photovoltaic cell wafer, and a photo-detector wafer.

9. The method according to claim 1, wherein the optical layer includes two or more layers.

10. The method according to claim 1, wherein at least one of the etching steps comprises dry etching, said dry etching including any one or a combination of RIE, ICP or ion milling.

11. The method according to claim 1, wherein the shape of the particles is selected from the group consisting of: spherical and ellipsoidal.

12. The method according to claim 1, wherein the particles are placed in a pattern selected from the group comprising: an ordered pattern, an unordered pattern, and a partly ordered pattern.

13. The method according to claim 12, wherein the ordered pattern is a hexagonal close packed pattern.

14. The method according to claim 1, wherein the material of the particles includes at least one of polymer, dielectric material, and metal.

15. The method according to claim 14, wherein the polymer is polystyrene.

16. The method according to claim 1, wherein the optical elements form components within any one of the following devices: LED, photo-detector, photovoltaic cell or photonic crystal devices.

17. The method according to claim 1, wherein each first etching process is performed for a first pre-determined duration.

18. The method according to claim 17, wherein the first pre-determined duration is a function of the selected shape of each optical element.

19. The method according to claim 17, wherein the first pre-determined duration for each cycle of the first etching process is independent of the first pre-determined duration for other cycles of the first etching process.

20. The method according to claim 1, wherein each second etching process is performed for a second predetermined duration.

21. The method according to claim 20, wherein the second pre-determined duration is a function of the selected shape of each optical element.

22. The method according to claim 20, wherein the second pre-determined duration for each cycle of the second etching process is independent of the second pre-determined duration for other cycles of the second etching process.

23. A method of forming an array of selectively shaped optical elements on a substrate, the method comprising the steps of:
    providing the substrate, said substrate having an optical layer placed thereon;
    depositing a sacrificial layer of a pre-determined thickness on the optical layer;
    placing a layer of particles on the sacrificial layer; and
    performing an etching cycle, said cycle comprising the steps of:
        etching the layer of particles, using a first etching process so as to reduce the size of the particles within the layer; then;
        simultaneously etching the sacrificial layer and the layer of particles, using a second etching process, the further reducing particles forming a mask over areas of the sacrificial layer to create surface structures from the sacrificial layers; and
        transferring the surface structures from the sacrificial layer to the optical layer by dry etching.

24. The method according to claim 23, further including the step, prior to the placing step, of treating a surface of the sacrificial layer so as to be hydrophilic.

25. The method according to claim 23, wherein the first etching process etches the particles at a rate slower than the second etching process.

26. The method according to claim 23, wherein a ratio of the etching rates between the particles and the sacrificial layer, during the second etching process, is in the range of 3 to −10.

27. The method according to claim 26, wherein the ratio of the etching rates between the particles and the sacrificial layer, during the second etching process, is in the range of 2 to −5.

28. The method according to claim 23, wherein a ratio of the etching rates between the sacrificial layer and the optical layer is in the range of 5 to −10.

29. The method according to claim 28, wherein the ratio of the etching rates between the sacrificial layer and the optical layer is in the range of 3 to −5.

30. A method of forming an array of selectively shaped optical elements on a substrate, the method comprising the steps of:

providing the substrate, said substrate having an optical layer placed thereon;

placing a layer of particles on the optical layer;

performing an etching cycle, said cycle comprising the steps of:

etching the layer of particles, using a first etching process so as to reduce the size of the particles within the layer, then;

etching the optical layer, using a second etching process, the reduced particles forming a mask over areas of the optical layer to create discrete optical elements from the optical layer;

repeating the etching cycle at least once to further reduce the particle size and shape the optical elements, so as to form the selected shape of each optical element.

* * * * *